(12) United States Patent
Chang (10) Patent No.: US 11,379,073 B2
(45) Date of Patent: *Jul. 5, 2022

(54) REMOTE TOUCH SENSITIVE MONITORING SYSTEM AND APPARATUS

(71) Applicant: EGALAX_EMPIA TECHNOLOGY INC., Taipei (TW)

(72) Inventor: Chin-Fu Chang, Taipei (TW)

(73) Assignee: EGALAX_EMPIA TECHNOLOGY INC., Taipei (TW)

(*) Notice: Subject to any disclaimer, the term of this patent is extended or adjusted under 35 U.S.C. 154(b) by 0 days.

This patent is subject to a terminal disclaimer.

(21) Appl. No.: 17/399,291

(22) Filed: Aug. 11, 2021

(65) Prior Publication Data

US 2021/0373699 A1 Dec. 2, 2021

Related U.S. Application Data

(63) Continuation-in-part of application No. 15/393,504, filed on Dec. 29, 2016, now Pat. No. 11,119,607.

(30) Foreign Application Priority Data

Dec. 31, 2015 (TW) .................. 104144652

(51) Int. Cl.
*G06F 3/041* (2006.01)
*H04L 67/025* (2022.01)
*G06F 3/04847* (2022.01)

(52) U.S. Cl.
CPC ........ *G06F 3/0416* (2013.01); *G06F 3/04847* (2013.01); *H04L 67/025* (2013.01)

(58) Field of Classification Search
CPC .................................................. G06F 3/0416
See application file for complete search history.

(56) References Cited

U.S. PATENT DOCUMENTS

| 10,282,266 B2 | 5/2019 | Yang et al. |
| 2014/0181715 A1* | 6/2014 | Axelrod .................. G06F 3/017 715/771 |
| 2015/0109225 A1 | 4/2015 | Hu |

FOREIGN PATENT DOCUMENTS

| CN | 104679324 | 6/2015 |
| CN | 105045692 | 11/2015 |
| TW | 201216133 | 4/2012 |

* cited by examiner

*Primary Examiner* — Roland J Casillas
(74) *Attorney, Agent, or Firm* — WPAT, PC (57) ABSTRACT

An apparatus is provided for remote monitoring a first apparatus. The first apparatus comprises a touch screen, a touch sensitive module being coupled to the touch screen, a first network module being connected to a network, and a first processing module. The apparatus comprising: a second network module, configured to connect to the network; and a second processing module, configured to execute a second program stored in a non-volatile memory for realizing following steps: transmitting a setting parameter to the first apparatus via the second network module, wherein the first processing module is configured for receiving the setting parameter of the touch sensitive module from the first network module, commanding the touch sensitive module to use the setting parameter to get touch sensitive information corresponding to the touch screen, and receiving the touch sensitive information from the touch sensitive module and transmitting the touch sensitive information to the apparatus; and receiving the touch sensitive information from the first apparatus via the second network module.

14 Claims, 4 Drawing Sheets

REMOTE TOUCH SENSITIVE MONITORING SYSTEM AND APPARATUS

CROSS REFERENCES TO RELATED APPLICATION

This application is a continuation-in-part application of U.S. patent application, Ser. No. 15/393,504, filed on Dec. 29, 2016 which claims priority to Taiwan patent application, No. 104144652, filed on Dec. 31, 2015, the disclosures of which are incorporated herein by reference.

BACKGROUND OF THE INVENTION

1. Field of the Invention

The present invention relates to the field of remote monitoring system, and more particularly, to a remote touch sensitive monitoring system.

2. Description of the Prior Art

Touch screens or panels are one of the main input/output devices of modern electronic apparatuses, and are relied upon by modern electronic apparatuses, such as iPhone and iPad devices by the Apple Inc., as the main input/output devices. When touch sensitive or controlling function(s) of the touch screen is(are) out of order or breaks(break) down, the electronic apparatus of the touch screen will need to be sent to the original seller company or manufacturer for repair. For a user, this means not being able to use his/her electronic apparatus when it's sent back for repair, and the sensitive or confidential information stored on the electronic apparatus may be revealed or lost in the process of being sent back and repaired.

On the other hand, when an electronic apparatus is about to be shipped from its factory, its touch screen may be set, tested, and calibrated according to its future environment(s) of use. For example, electronic apparatuses of different models may use touch sensitive or controlling integrated circuits of the same model to control their touch screens, while there are different needs and preferences in the electronic apparatuses. A cheap electronic apparatus of some type may not need the multi-touch function, so manufacturers of this type of electronic apparatuses need to configure the touch sensitive or controlling integrated circuits to turn off the multi-touch function. Or an electronic apparatus of some type may need the function of detecting its active stylus, so manufacturers of this type of electronic apparatuses need to configure the touch sensitive or controlling integrated circuits to turn on this function. With current technologies, the touch sensitive or controlling integrated circuits of the electronic apparatus can only be set, tested, and calibrated through a physical interface connected to the electronic apparatus, which way of setting is quite laborious and time-consuming.

Considering the above disadvantages as a whole, there is urgent need in the market for a system capable of remotely receiving relevant information of a touch screen or touch panel. In addition to receiving this information, the system may be able to remotely set or configure the parameter(s) of the touch sensitive or controlling integrated circuits of the touch screen or touch panel.

SUMMARY OF THE INVENTION

According to an embodiment, the present application provides a remote touch sensitive monitoring system, comprising a first apparatus and a second apparatus. The first apparatus, comprising: a touch screen; a touch sensitive module, configured to be coupled to the touch screen; a first network module, configured to connect to a network; and a first processing module, configured to execute a first program stored in a non-volatile memory for realizing following steps: receiving a setting parameter of the touch sensitive module from a second apparatus of the remote touch sensitive monitoring system via the first network module; commanding the touch sensitive module to use the setting parameter to get touch sensitive information corresponding to the touch screen; and receiving the touch sensitive information from the touch sensitive module and transmitting the touch sensitive information to the second apparatus. The second apparatus, comprising: a second network module, configured to connect to the network; and a second processing module, configured to execute a second program stored in another non-volatile memory for realizing following steps: transmitting the setting parameter to the first apparatus via the second network module; and receiving the touch sensitive information from the first apparatus via the second network module.

According to an embodiment, the present application provides an apparatus for remote monitoring a first apparatus. The first apparatus comprises a touch screen, a touch sensitive module being coupled to the touch screen, a first network module being connected to a network, and a first processing module. The apparatus comprising: a second network module, configured to connect to the network; and a second processing module, configured to execute a second program stored in a non-volatile memory for realizing following steps: transmitting a setting parameter to the first apparatus via the second network module, wherein the first processing module is configured for receiving the setting parameter of the touch sensitive module from the first network module, commanding the touch sensitive module to use the setting parameter to get touch sensitive information corresponding to the touch screen, and receiving the touch sensitive information from the touch sensitive module and transmitting the touch sensitive information to the apparatus; and receiving the touch sensitive information from the first apparatus via the second network module.

In summary, the present invention provides a remote touch sensitive monitoring system not only remotely receiving touch sensitive information of the touch screen or touch panel but also remotely setting or configuring the parameter(s) of the touch sensitive or controlling integrated circuits of the touch screen or touch panel.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

Figure 1:
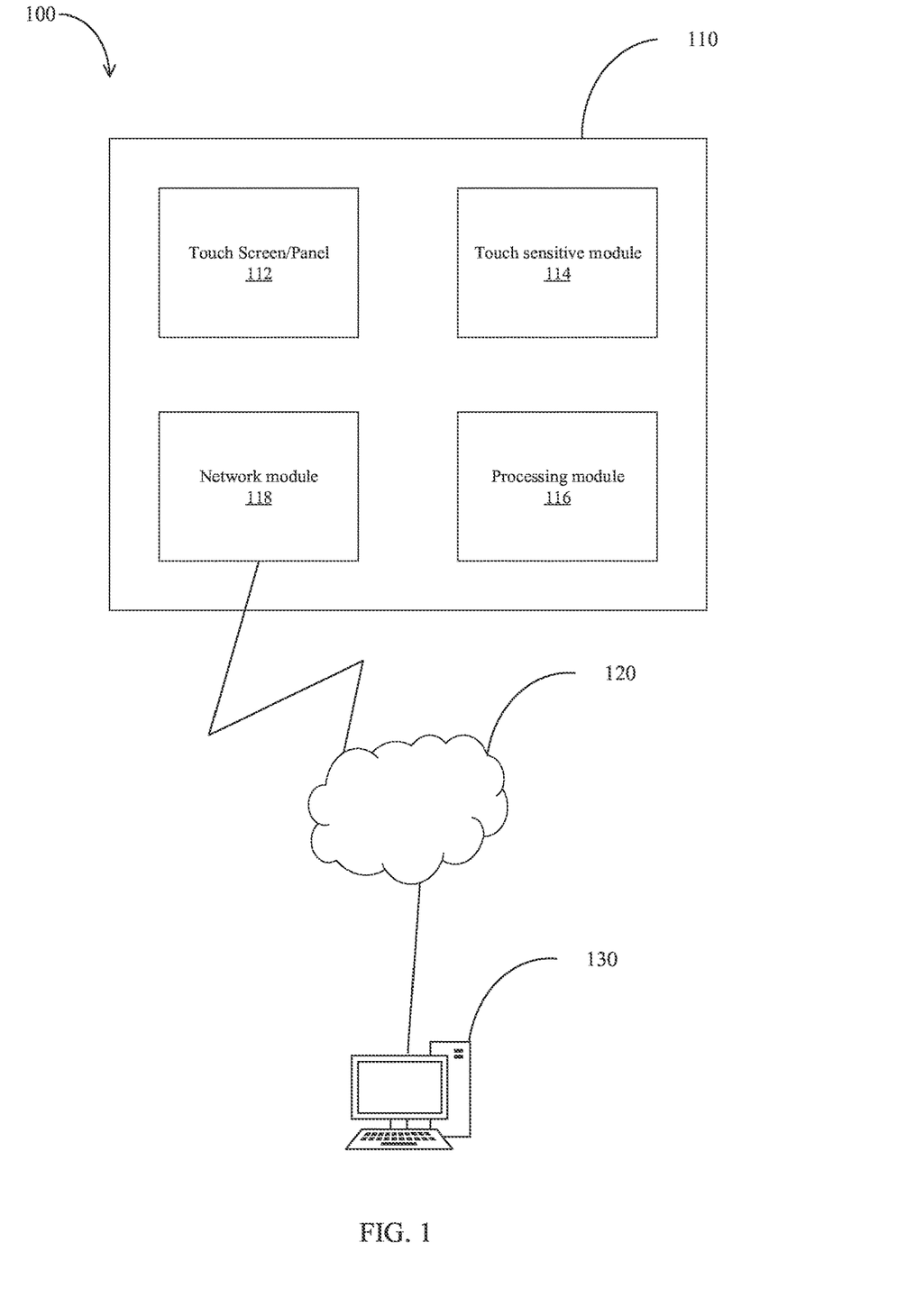
FIG. 1 illustrates a remote touch sensitive monitoring system according to an embodiment of the present invention.

Referring to FIG. 1, a remote touch sensitive monitoring system according to an embodiment of the present invention is illustrated. A remote touch sensitive monitoring system 100 includes a monitored apparatus 110 and a monitoring apparatus 130. The monitored apparatus 110 includes a touch screen 112 (or a touch panel 112, for the convenience of illustration and explanation, the term of touch screen used in this application is thereinafter used to represent touch screen and/or touch panel), a touch sensitive module 114 configured to couple to the touch screen 112, a processing module 116 configured to couple to the touch screen 112 and the touch sensitive module 114, and a network module 118.

The touch sensitive module 114 may include one or several touch sensitive or controlling integrated circuit(s) for being configured to couple to multiple touch sensitive electrodes of the touch screen 112. And thereinafter, the term of touch sensitive integrated circuit includes touch sensitive integrated circuit and/or touch controlling integrated circuit. The touch screen 112 and the touch sensitive module 114 may be implemented in the touch sensitive mechanism of resistive touch, capacitive touch, surface acoustic wave touch, infrared touch, etc. The present invention is not limited to the touch sensitive mechanism of the touch screen 112 and the touch sensitive module 114.

In some embodiments, the touch sensitive module 114 may include an analog front-end (AFE) circuit, a microprocessor, and a memory module configured to connect with the microprocessor. The microprocessor may be used to execute the program of microprocessor that is stored in the memory module, and process the analog signal transmitted from the AFE circuit according to the parameter(s) stored in the memory module, and save the calculated touch sensitive information in the memory module.

When a projective capacitive mechanism is adopted, calculation results of the microprocessor may include at least one two-dimensional touch sensitive information array, which may be an image covering intersection points corresponding to and between touch sensitive electrodes of the touch screen 112. The image may include base values; detection values; the difference between detection values of touch sensitive electrodes adjacent to each other; and/or difference between two calculated difference instances (which may be called dual-difference) of the mutually-adjacent touch sensitive electrodes. And calculation results of the microprocessor may also include relevant touch sensitive information corresponding to approaching events by an external conductive object which approaches or thereby touches the touch screen 112. For example, the relevant touch sensitive information may include a one-dimensional sensing information line segment (section), or a group of multiple mutually-adjacent one-dimensional sensing information line segments (sections). The one-dimensional sensing information line segment may include any combination of the following subjects of sensing information: touch sensitive electrodes, touch starting position, touch ending position, center position, center of mass position, detection values of each point, etc., corresponding to the sensing information line segment. And the group of multiple sensing information line segments may include one-dimensional sensing information corresponding to each line segment of the group of sensing information line segments. Since the present invention is not limited to the touch sensitive mechanisms of the above touch screen 112 and touch sensitive module 114, calculation results of the microprocessor are not limited to the above described contents of calculation results.

In addition to storing touch sensitive information and/or calculation results in the memory module, the touch sensitive module 114 may further provide the touch sensitive information to the processing module 116, which controls the monitored apparatus 110, so that the operation system executed by the processing module 116 can inform relative application(s) or operation system to handle the approaching or approximate event based on relative event-processing routine triggered by the touch sensitive information.

In the embodiment of FIG. 1, the network module 118 included by the monitored apparatus 110 may be a wired or wireless network interface. The present invention is not limited to the specification of the network module 118, as long as the network module 118 can connect/link to the monitoring apparatus 130 through a network 120. In some embodiments, the network connection/linking rate between the network module 118 and the monitoring apparatus 130 may support the touch sensitive information generated by the touch sensitive module 114 to be transmitted to the monitoring apparatus 130 in real-time. In addition, the monitored apparatus 110 may also be directly connected or linked to the monitoring apparatus 130 without through the network 120.

When the network 120 is a common transmission control protocol/internet protocol (TCP/IP) network, the monitored apparatus 110 may use TCP package to transmit touch sensitive information and/or parameter(s). Since TCP has the functions of re-transmitting and sequencing, the sequence of received packages is guaranteed to the sequence of transmitted packages. In other words, the received touch sensitive information is in the order of time sequence. When UDP packages are used to transmit touch sensitive information and/or parameter(s), the monitored apparatus 110 and the monitoring apparatus 130 may use an upper level of protocol to re-transmit and sequence UDP packages for ensuring the sequence of received packages is in the order of the sequence of transmitted packages. Accordingly, the monitored apparatus 110 and the monitoring apparatus 130 do not need to care about lost UDP package(s) and transmission sequence.

The monitoring apparatus 130 may also use the network 120 to transmit the parameter(s) and/or setting command(s) which is/are intended to set the touch sensitive module 114 to the monitored apparatus 110. When the monitored apparatus 110 receives the parameter(s) and/or setting command(s) from the monitoring apparatus 130, the processing module 116 will transmit the parameter(s) and/or setting command(s) received from the network module 118 to the touch sensitive module 114 and make them effective. When new parameter(s) and/or setting command(s) start to be operated in the touch sensitive module 114, the monitoring apparatus 130 can let the user monitor that whether achieving the required effect by the received touch sensitive information and/or parameter(s). When another adjustment is required, new parameter(s) and/or setting command(s) can be transmitted to the monitored apparatus 110 again until this task ends.

In some embodiments, communication between the monitored apparatus 110 and the monitoring apparatus 130 may include the processes of compression, decompression, encryption, and/or decryption. The present invention is not limited to whether the communication between the monitored apparatus 110 and the monitoring apparatus 130 having extra processes.

The monitoring apparatus 130 is not necessary to be interposed by the user, and it may renew the parameter(s) of the touch sensitive module 114 of the monitored apparatus 110 by itself. Accordingly, the monitoring apparatus 130 may monitor the operation of the touch sensitive module 114 without requiring a human/machine interface. In some embodiments, the monitoring apparatus 130 further includes a monitoring application program used to display all kinds of received touch sensitive information and/or parameter(s) for real-time showing to the user via the human/machine interface.

Figure 2:
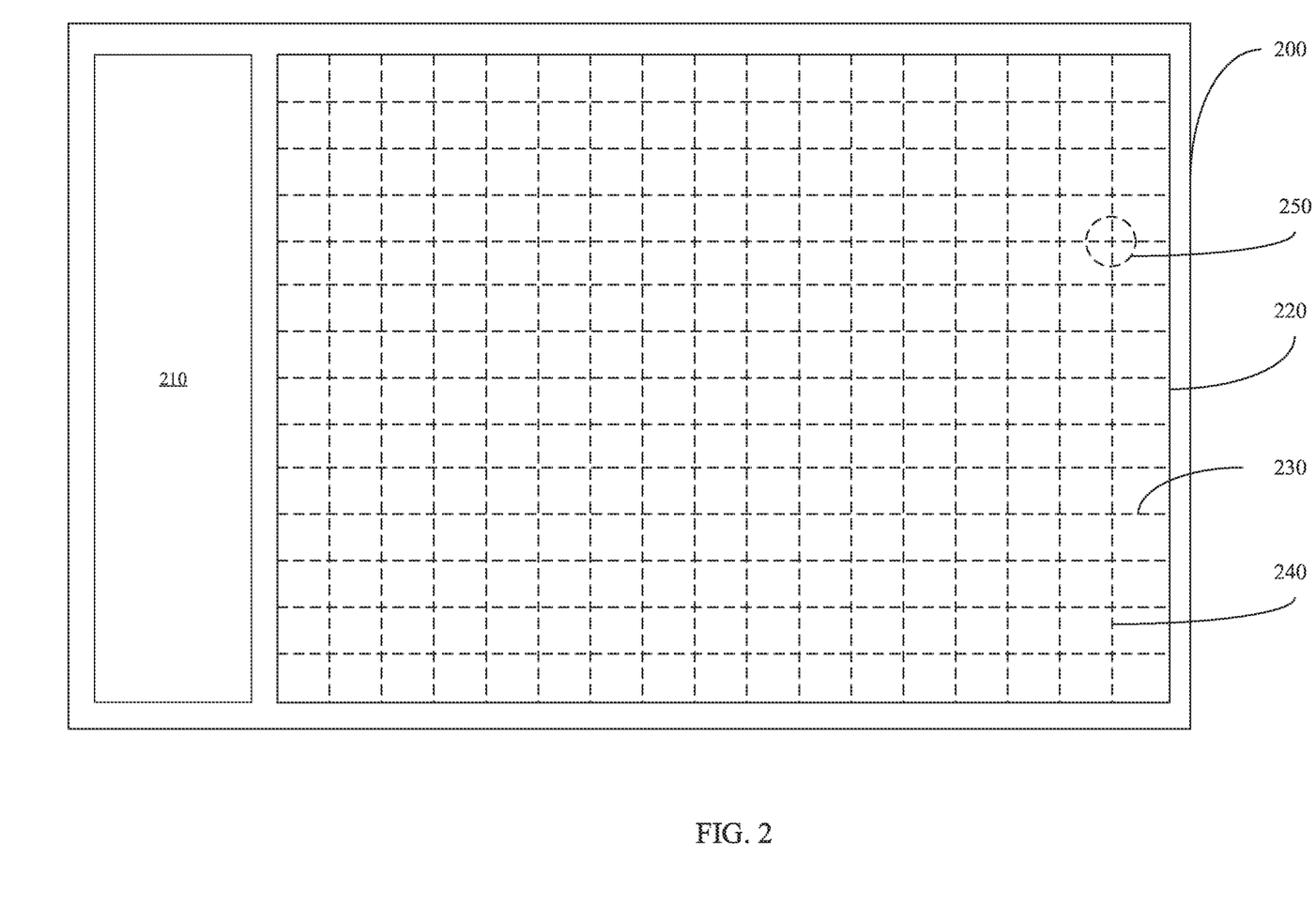
FIG. 2 shows a picture of a monitoring application program according to an embodiment of the present invention.

Referring to FIG. 2, a picture of a monitoring application program according to an embodiment of the present invention is illustrated. The monitoring application program 200 may be a window program or a whole screen program. The operation system of the monitoring apparatus 130 may execute at least one monitoring application program 200 for displaying the state of the touch sensitive module 114 of at least one monitored apparatus 110, or execute multiple monitoring application programs to respectively display the states of the touch sensitive modules 114 of the monitored apparatuses 110.

The monitoring application program 200 may include two display areas, one is setting display area 210, and the other is state display area 220. However, the present invention is not limited to the monitoring application program 200 having to include these two display areas. The setting display area 210 is used to display or set the state(s) of the setting parameter(s) and/or touch sensitive information of the touch sensitive module 114. The state display area 220 is used to display the received touch sensitive information of the touch sensitive module 114.

As shown in FIG. 2, the state display area 220 includes multiple line segments 230 and 240, which respectively represent multiple first electrodes being parallel to each other and multiple second electrodes being parallel to each other on the touch screen 112. The first electrodes and the second electrodes intersect at multiple points, and the state display area 220 also includes multiple intersections 250 to represent the abovementioned points. The number of the line segments 230 matches that of the first electrodes, the number of the line segments 240 matches that of the second electrodes, and hence the number of intersections 250 naturally matches that of the multiple points intersected by the first electrodes and the second electrodes.

In some embodiments, the intersection 250 may include at least one numeral to denote touch sensitive information of the relative intersection. For example, as mentioned above, the numeral may be base value, detection value, the difference between detection values of adjacent electrodes, or the difference of two adjacent differences (dual difference).

In some embodiments, the intersections 250 and/or line segments 230 and 240 may change their displaying color according to touch sensitive information. For example, the line segments 230 and/or 240 may display special color according to determined one-dimensional sensing information line segment(s). When the touch sensitive module 114 determines multiple groups of line segment, each group of line segment may have different displaying color. When the touch sensitive module 114 determines that a palm is approaching, the area regarded as the palm can be framed and/or displayed in different color. When the touch sensitive module 114 determines that a stylus is approaching, it can use different color to display the position and/or state of the stylus. When multiple styluses are approaching, different colors are used to respectively display the position and/or state of each of the styluses. In addition, the state display area 220 may indicate the centroid of each line segment and/or of each group of line segment, and further display the centroid in different color. Moreover, the side of the centroid mentioned above may further include a set of numeral for displaying the coordinate position thereof.

The state of setting parameter and/or touch sensitive information in the setting display area 210 may include the read-only message, such as the network address, type, resolution of the monitored apparatus 110, and the type, firmware version, transmission rate of touch sensitive message of the touch sensitive module 114. User may set or configure the parameter of the touch sensitive module 114 through the setting display area 210, for example, such as report rate, computational accuracy, algorithm of calculation, intended noise-filtering level, and/or all kinds of parameters of the AFE circuit. The parameters of the AFE circuit may include the voltage of driving signal, driving time or period, driving time point, and the detection time or period of the detection circuit, the variable resistance of the detection circuit, and the amplifier value of the detection circuit, detection time point/phase difference of the detection circuit.

The person having ordinary skill in the art can appreciates that the abovementioned parameter(s), setting commands, and touch sensitive information are only used for some instances. The present invention is not limited to the setting parameter(s) and touch sensitive information in the remote touch sensitive monitoring system 100.

Referring to FIG. 1, in an embodiment of the present invention, a monitored apparatus of a remote touch sensitive monitoring system is provided. The monitored apparatus includes a touch screen, a touch sensitive module configured to couple to the touch screen, a network module, and a processing module configured to couple to the touch sensitive module and the network module. The processing module is configured to execute a program for receiving touch sensitive information of the touch screen calculated by the touch sensitive module and transmitting the touch sensitive information through the network module to a monitoring apparatus of the remote touch sensitive monitoring system.

In some embodiments, the program executed by the processing module is further used to receive a setting parameter of the touch sensitive module and transmit the touch sensitive information through the network module to the monitoring apparatus.

In some embodiments, the program executed by the processing module is further used to receive the setting parameter of the monitoring apparatus through the network module and command the touch sensitive module to use the setting parameter to get the touch sensitive information of the touch screen.

Figure 3:
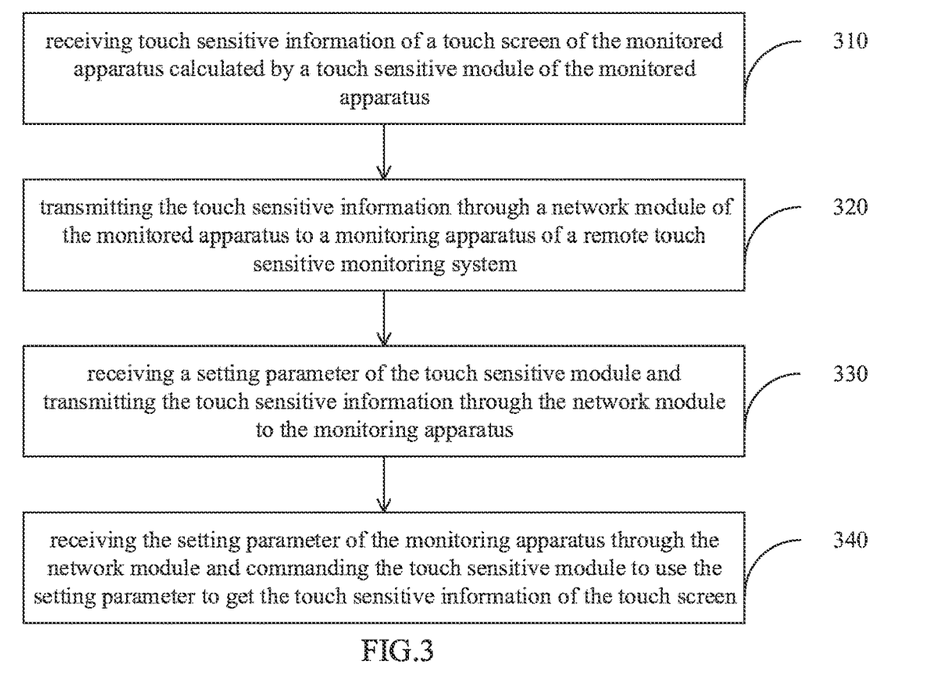
FIG. 3 illustrates a flowchart of a controlling method for a monitored apparatus according to an embodiment of the present invention.

Referring to FIG. 3, a flowchart of a controlling method for a monitored apparatus according to an embodiment of the present invention is illustrated. The controlling method may be implemented by a program executed by the processing module 116. The controlling method includes the following steps, and except for causal relationship, the present invention is not limited to the execution order of these steps.

In step 310: receiving touch sensitive information of a touch screen of the monitored apparatus calculated by a touch sensitive module of the monitored apparatus.

In step 320: transmitting the touch sensitive information through a network module of the monitored apparatus to a monitoring apparatus of a remote touch sensitive monitoring system.

In step 330: receiving a setting parameter of the touch sensitive module and transmitting the touch sensitive information through the network module to the monitoring apparatus.

In step 340: receiving the setting parameter of the monitoring apparatus through the network module and commanding the touch sensitive module to use the setting parameter to get the touch sensitive information of the touch screen.

Referring to FIG. 1, in an embodiment of the present invention, a monitoring apparatus of a remote touch sensitive monitoring system is provided. The monitoring apparatus is configured to execute a monitoring application program for receiving touch sensitive information of a monitored apparatus of the remote touch sensitive monitoring system and displaying the touch sensitive information on a screen of the monitoring apparatus.

In some embodiments, the monitoring application program is further used to receive a setting parameter of a touch sensitive module of the monitored apparatus and display the setting parameter on the screen.

In some embodiments, the monitoring application program is further used to receive a setting command about the setting parameter and transmit the setting parameter to the monitored apparatus.

Figure 4:
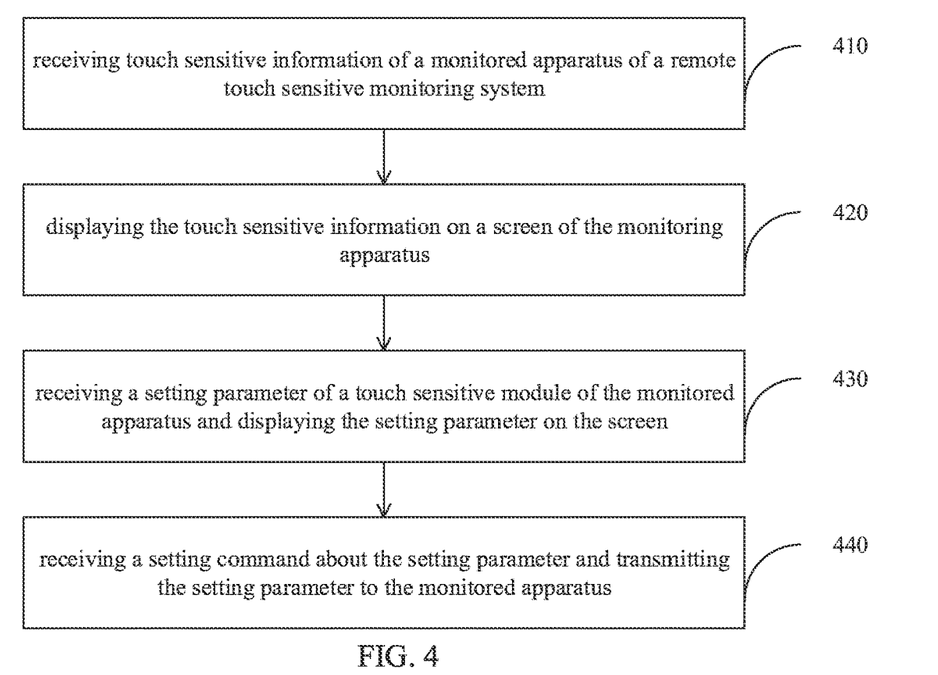
FIG. 4 illustrates a flowchart of a controlling method for a monitoring apparatus according to an embodiment of the present invention.

Referring to FIG. 4, a flowchart of a controlling method for a monitoring apparatus according to an embodiment of the present invention is illustrated. The controlling method may be implemented by a monitoring application program executed by the monitoring apparatus 130. The controlling method includes the following steps, and except for causal relationship, the present invention is not limited to the execution order of these steps.

In step 410: receiving touch sensitive information of a monitored apparatus of a remote touch sensitive monitoring system.

In step 420: displaying the touch sensitive information on a screen of the monitoring apparatus.

In step 430: receiving a setting parameter of a touch sensitive module of the monitored apparatus and displaying the setting parameter on the screen.

In step 440: receiving a setting command about the setting parameter and transmitting the setting parameter to the monitored apparatus.

Referring to FIG. 1, in an embodiment of the present invention, a remote touch sensitive monitoring system is provided. This system includes a monitored apparatus and a monitoring apparatus. The monitored apparatus includes a touch screen, a touch sensitive module configured to couple to the touch screen, a network module, and a processing module configured to couple to the touch sensitive module and the network module. The processing module is configured to execute a program for receiving touch sensitive information of the touch screen calculated by the touch sensitive module and transmitting the touch sensitive information through the network module to the monitoring apparatus. The monitoring apparatus is configured to execute a monitoring application program for receiving the touch sensitive information of the monitored apparatus and displaying the touch sensitive information on a screen of the monitoring apparatus.

Figure 5:
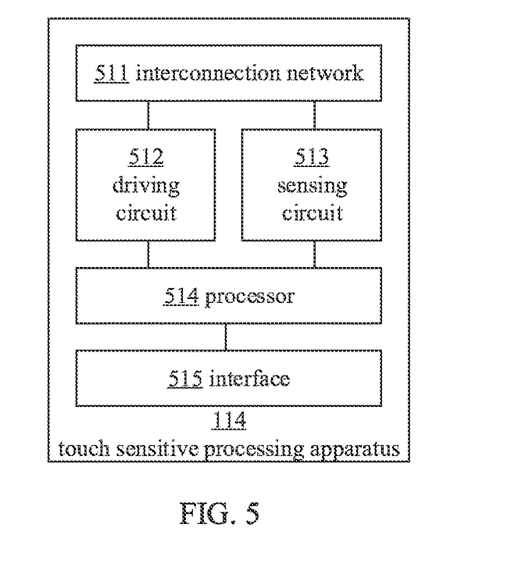
FIG. 5 depicts a block diagram of a touch sensitive module 114 in accordance with an embodiment of the present invention.

Please refer to FIG. 5, which depicts a block diagram of a touch sensitive module 114 in accordance with an embodiment of the present invention. The touch sensitive module 114 may comprise following hardware circuit modules: an interconnection network module 511, a driving circuit module 512, a sensing circuit module 513, a processor module 514, and an interface module 515. The touch sensitive processing apparatus 114 may be implemented inside a single integrated circuit which may include one or more chips. It may use multiple integrated circuits and an interconnected circuit board carried the multiple integrated circuits to realize the touch sensitive processing apparatus 114. The present application does not limit how to implement the touch sensitive module 114.

The interconnection network module 511 is configured to connect each of the multiple first electrodes and/or the multiple second electrodes of the touch screen 112. The interconnection network module 511 may accept control command of the processor module 514 for connecting the driving circuit module 512 and any one or more touch electrodes and for connecting the sensing circuit 513 and any one or more touch electrodes. The interconnection network module 511 may include a combination of one or more MUX to realize the aforementioned functions.

The driving circuit module 512 may comprise clock generator, frequency divider, frequency multiplier, phase lock loop, power amplifier, DC-DC voltage converter, regulator and/or filter, which is configured to provide driving signal to any one or more touch electrodes via the interconnection network module 511 according to control commands of the processor module 514. The driving signal may be modulated by kinds of analog or digital modulations for carrying some messages. The modulations include but not limit to frequency modulation (FM), phase modulation, amplitude modulation, dual sideband modulation (DSB), single sideband module (SSB-AM), vestigial sideband modulation, amplitude shift keying (ASK), phase shift keying (PSK), quadrature amplitude modulation (QAM), frequency shift keying (FSK), continuous phase modulation (CPM), code division multiple (CDMA), time division multiple access (TDMA), orthogonal frequency division multiplexing (OFDM), pulse width modulation (PWM) and etc. The driving signal may include one or more square waves, sinuous waves or any modulated waves. The driving circuit module 512 may include one or more channel. Each channel may be connected to any one or more touch electrodes via the interconnection network module 511.

The sensing circuit module 513 may comprise clock generator, frequency divider, frequency multiplier, phase lock loop, power amplifier, DC-DC voltage converter, regulator and/or filter, which is configured to sense on any one or more touch electrodes via the interconnection network module 511 according to control commands of the processor module 514. When the touch signal is transmitted from one of the touch electrodes, another touch electrode may induce the touch signal. And the sensing circuit module 513 may demodulate the induced touch signal by the another touch electrode in accordance with the modulation method performed on the driving signal by the driving circuit module 512 in order to restore the messages carried by the driving signal. The sensing circuit module 513 may include one or more channels. Each channel may be connected to any one or more touch electrodes via the interconnection network module 511. In the same time, each channel may simultaneously perform sensing and demodulation.

In one embodiment, the driving circuit module 512 and the sensing circuit module 513 may include analog front-end (AFE) circuits. In another embodiment, in additional to the AFE circuits, the driving circuit module 512 and the sensing circuit module 513 may include digital back-end (DBE) circuits. If the driving circuit module 512 and the sensing circuit module 513 include only the AFE circuits, the DBE circuits may be implemented in the processor module 514.

The processor module 514 may include a digital signal processor for connecting the AFE circuits or the DBE circuits of the driving circuit module 512 and the sensing circuit module 513, respectively. The processor module 514 may include an embedded processor, non-volatile memories and volatile memories. Normal or real-time operating system (OS) and their application programs may be stored in the non-volatile memories. The OS and the application programs include multiple instructions and data. The processor (including the embedded processor and the digital signal processor) may execute the instructions for controlling other modules including the interconnection network module 511, the driving circuit module 512, the sensing circuit module 513 and the interface module 515 of the touch sensitive module 114. For examples, the processor module 514 may comprises processors widely adopted in the industry such as 8051 series, Intel i960 series, ARM Cortex-M series and etc. The present application does not limit types and numbers of processors included in the processor module 514.

The instructions and data may be used to implement each of steps mentioned in the present application and flows and methods constructed by the steps. Some instructions may be executed independently inside the processor module 514, for examples, arithmetic and log operation instructions. Other instructions may be used to control other modules of the touch sensitive module 114. These instructions may include input/output interfaces of the processor module 514 to control other modules. Other modules may provide information via the input/output interface of the processor module 514 to the OS and/or application programs executed by the processor module 514. Persons having ordinary skill in the art should have common knowledge of computer organization and architecture which enabling them to understand that the flows and methods provided by the present application can be realized by the modules and the instructions.

The interface module 315 may include kinds of serial or parallel bus, such as universal serial bus (USB), I²C, peripheral component interconnect (PCI), PCI-Express, IEEE 1394 and other industrial standard input/output interface. The touch sensitive module 114 connects to the processing module 116 via the interface module 515.

Figure 6:
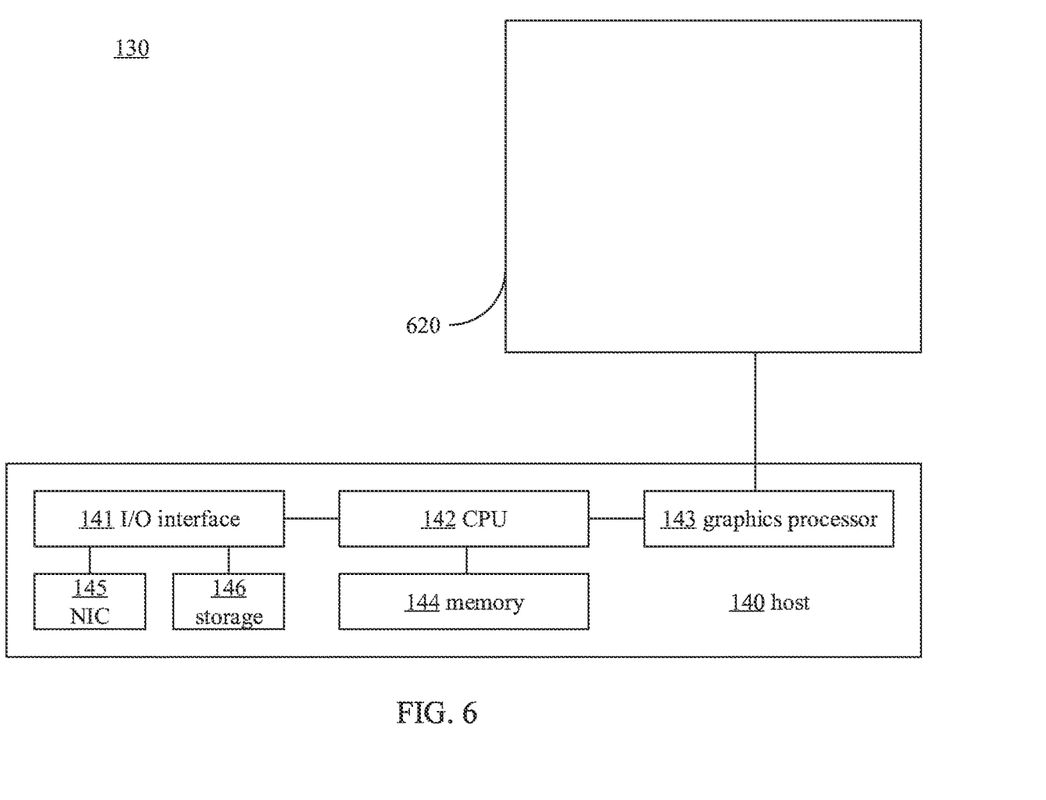
FIG. 6 depicts a block diagram of a monitoring apparatus 130 in accordance with an embodiment of the present invention.

Please refer to FIG. 6, which depicts a block diagram of a monitoring apparatus 130 in accordance with an embodiment of the present invention. It may comprises an input/output interface module 141, a central processing unit (CPU) module 142, a graphics processor module 143, a memory module 144 connects to the CPU module 142, a network interface module 145 and a storage module 146 connect to the input/output interface module 141.

The storage module 146 comprises non-volatile memory. Common examples are hard disks, electronic erasable rewritable read only memory (EEPROM), or flash memory. The storage module 146 may store normal operating system and application programs executable under the operating system. The network interface module 145 may comprise wired or wireless hardware network interface. The network interface module 145 may be compliant to common industrial standards such as IEEE 802.11 Wireless Local Area Network, IEEE 802.3 Local Area Network, 3G, 4G and/or 5G wireless telecommunication standards, Bluetooth wireless communication standards, and etc.

The CPU module 142 may directly or indirectly connects to the input/output interface module 141, the graphics processor module 143, the memory module 144, the network interface module 145 and one storage module 146. The CPU module 142 may comprises one or more processor or processor cores. Common processors may include Intel, AMD, VIA's x86 and x64 instruction set architecture (ISA) processors, Apple, Qualcomm, Mediatek's ARM ISA processors, or any other types of complex instruction set computer (CISC) or reduced instruction set computer (RISC) processors. The OS and application programs include multiple instructions and data corresponding to the instruction set. By executing these instructions, the CPU module 142 is able to control other modules of the monitoring apparatus 130.

The optional graphics processor module 143 is usually configured to handle computations with respect to graphics outputs. The graphics processor module 143 may connect to the screen 620 for controlling outputs of the screen 620. In some applications, the monitoring apparatus 130 may have the CPU module 142 execute the computations with respect to graphics outputs, without dedicated handling of the graphics processor module 143.

The monitoring apparatus 130 may comprise components or apparatus not shown in FIG. 6, for example, audio input/output interface, keyboard input interface, mouse input interface, track-ball input interface and/or any other hardware modules. Persons having ordinary skill in the art should have common knowledge of computer organization and architecture. They can understand the monitoring apparatus 130 disclosed by the present application is exemplary. Parts regarding to the inventive feature provided by the present application should be referred to the specification and the claim.

According to an embodiment, the present application provides a remote touch sensitive monitoring system, comprising a first apparatus and a second apparatus. The first apparatus, comprising: a touch screen; a touch sensitive module, configured to be coupled to the touch screen; a first network module, configured to connect to a network; and a first processing module, configured to execute a first program stored in a non-volatile memory for realizing following steps: receiving a setting parameter of the touch sensitive module from a second apparatus of the remote touch sensitive monitoring system via the first network module; commanding the touch sensitive module to use the setting parameter to get touch sensitive information corresponding to the touch screen; and receiving the touch sensitive information from the touch sensitive module and transmitting the touch sensitive information to the second apparatus. The second apparatus, comprising: a second network module, configured to connect to the network; and a second processing module, configured to execute a second program stored in another non-volatile memory for realizing following steps: transmitting the setting parameter to the first apparatus via the second network module; and receiving the touch sensitive information from the first apparatus via the second network module.

Preferably, in order to show status of the first apparatus being monitored, the second apparatus further comprises a display for showing one or any combination of following: the setting parameter; and the touch sensitive information received from the first apparatus.

Preferably, in order to control the analog front end circuits of the touch sensitive module of the first apparatus, the setting parameter is one of following: a voltage of driving signal; a driving time period; a driving timing; a detection time period; a variable resistance of a detection circuit of the touch sensitive module; an amplifier value of the detection circuit; and a detection timing of the detection circuit.

Preferably, in order to simplify remote diagnose or trouble shooting process, the setting parameter is configured to control the touch sensitive module to turn on or off multiple-touch function for detecting more than one external conductive objects approaching or touching the touch screen.

Preferably, in order to simplify remote diagnose or trouble shooting process, the setting parameter is configured to control the touch sensitive module to turn on or off stylus detection function for detecting one or more styli approaching or touching the touch screen.

Preferably, in order to aware situations with regard to the touch screen utilizing mutual-capacitance principle, the touch screen comprises parallel first electrodes and parallel second electrodes, the first and the second electrodes intersect each other at multiple intersections, wherein the sensitive information comprises one or any combination of followings: base values corresponding to the intersections; detection values corresponding to the intersections; difference values of the detection values corresponding to the intersections; and difference values of the difference values of the detection values corresponding to the intersections.

Preferably, in order to aware situations with regard to the touch screen utilizing self-capacitance principle, the touch screen comprises parallel first electrodes and parallel second electrodes, the first and the second electrodes intersect each other at multiple intersections, wherein the sensitive information comprises one or any combination of followings: base values corresponding to the first electrodes; detection values corresponding to the first electrodes; difference values of the detection values corresponding to the first electrodes; base values corresponding to the second electrodes; detection values corresponding to the second electrodes; and difference values of the detection values corresponding to the second electrodes.

According to an embodiment, the present application provides an apparatus for remote monitoring a first apparatus. The first apparatus comprises a touch screen, a touch sensitive module being coupled to the touch screen, a first network module being connected to a network, and a first processing module. The apparatus comprising: a second network module, configured to connect to the network; and a second processing module, configured to execute a second program stored in a non-volatile memory for realizing following steps: transmitting a setting parameter to the first apparatus via the second network module, wherein the first processing module is configured for receiving the setting parameter of the touch sensitive module from the first network module, commanding the touch sensitive module to use the setting parameter to get touch sensitive information corresponding to the touch screen, and receiving the touch sensitive information from the touch sensitive module and transmitting the touch sensitive information to the apparatus; and receiving the touch sensitive information from the first apparatus via the second network module.

Preferably, in order to show status of the first apparatus being monitored, the apparatus further comprises a display for showing one or any combination of following: the setting parameter; and the touch sensitive information received from the first apparatus.

Preferably, in order to control the analog front end circuits of the touch sensitive module of the first apparatus, the setting parameter is one of following: a voltage of driving signal; a driving time period; a driving timing; a detection time period; a variable resistance of a detection circuit of the touch sensitive module; an amplifier value of the detection circuit; and a detection timing of the detection circuit.

Preferably, in order to simplify remote diagnose or trouble shooting process, the setting parameter is configured to control the touch sensitive module to turn on or off multiple-touch function for detecting more than one external conductive objects approaching or touching the touch screen.

Preferably, in order to simplify remote diagnose or trouble shooting process, the setting parameter is configured to control the touch sensitive module to turn on or off stylus detection function for detecting one or more styli approaching or touching the touch screen.

Preferably, in order to aware situations with regard to the touch screen utilizing mutual-capacitance principle, the touch screen comprises parallel first electrodes and parallel second electrodes, the first and the second electrodes intersect each other at multiple intersections, wherein the sensitive information comprises one or any combination of followings: base values corresponding to the intersections; detection values corresponding to the intersections; difference values of the detection values corresponding to the intersections; and difference values of the difference values of the detection values corresponding to the intersections.

Preferably, in order to aware situations with regard to the touch screen utilizing self-capacitance principle, the touch screen comprises parallel first electrodes and parallel second electrodes, the first and the second electrodes intersect each other at multiple intersections, wherein the sensitive information comprises one or any combination of followings: base values corresponding to the first electrodes; detection values corresponding to the first electrodes; difference values of the detection values corresponding to the first electrodes; base values corresponding to the second electrodes; detection values corresponding to the second electrodes; and difference values of the detection values corresponding to the second electrodes.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A remote touch sensitive monitoring system, comprising:
   a first apparatus, comprising:
   a touch screen;
   a touch sensitive module, configured to be coupled to the touch screen;
   a first network module, configured to connect to a network; and
   a first processing module, configured to execute a first program stored in a non-volatile memory for realizing following steps:

receiving a setting parameter of the touch sensitive module from a second apparatus of the remote touch sensitive monitoring system via the first network module;

commanding the touch sensitive module to use the setting parameter to get touch sensitive information corresponding to the touch screen; and receiving the touch sensitive information from the touch sensitive module and transmitting the touch sensitive information to the second apparatus; and the second apparatus, comprising:
a second network module, configured to connect to the network; and
a second processing module, configured to execute a second program stored in another non-volatile memory for realizing following steps:
transmitting the setting parameter to the first apparatus via the second network module; and
receiving the touch sensitive information from the first apparatus via the second network module.

2. The remote touch sensitive monitoring system as claimed in claim 1, wherein the second apparatus further comprises a display for showing one or any combination of following:
the setting parameter; and
the touch sensitive information received from the first apparatus.

3. The remote touch sensitive monitoring system as claimed in claim 1, wherein the setting parameter is one of following:
a voltage of driving signal;
a driving time period;
a driving timing;
a detection time period;
a variable resistance of a detection circuit of the touch sensitive module;
an amplifier value of the detection circuit; and
a detection timing of the detection circuit.

4. The remote touch sensitive monitoring system as claimed in claim 1, wherein the setting parameter is configured to control the touch sensitive module to turn on or off multiple-touch function for detecting more than one external conductive objects approaching or touching the touch screen.

5. The remote touch sensitive monitoring system as claimed in claim 1, wherein the setting parameter is configured to control the touch sensitive module to turn on or off stylus detection function for detecting one or more styli approaching or touching the touch screen.

6. The remote touch sensitive monitoring system as claimed in claim 1, wherein the touch screen comprises parallel first electrodes and parallel second electrodes, the first and the second electrodes intersect each other at multiple intersections, wherein the sensitive information comprises one or any combination of followings:
base values corresponding to the intersections;
detection values corresponding to the intersections;
difference values of the detection values corresponding to the intersections; and
difference values of the difference values of the detection values corresponding to the intersections.

7. The remote touch sensitive monitoring system as claimed in claim 1, wherein the touch screen comprises parallel first electrodes and parallel second electrodes, the first and the second electrodes intersect each other at multiple intersections, wherein the sensitive information comprises one or any combination of followings:
base values corresponding to the first electrodes;
detection values corresponding to the first electrodes;
difference values of the detection values corresponding to the first electrodes;
base values corresponding to the second electrodes;
detection values corresponding to the second electrodes; and
difference values of the detection values corresponding to the second electrodes.

8. An apparatus for remote monitoring a first apparatus, wherein the first apparatus comprises a touch screen, a touch sensitive module being coupled to the touch screen, a first network module being connected to a network, and a first processing module, wherein the apparatus comprising:
a second network module, configured to connect to the network; and
a second processing module, configured to execute a second program stored in a non-volatile memory for realizing following steps:
transmitting a setting parameter to the first apparatus via the second network module, wherein the first processing module is configured for receiving the setting parameter of the touch sensitive module from the first network module, commanding the touch sensitive module to use the setting parameter to get touch sensitive information corresponding to the touch screen, and receiving the touch sensitive information from the touch sensitive module and transmitting the touch sensitive information to the apparatus; and
receiving the touch sensitive information from the first apparatus via the second network module.

9. The apparatus as claimed in claim 8, further comprises a display for showing one or any combination of following:
the setting parameter; and
the touch sensitive information received from the first apparatus.

10. The apparatus as claimed in claim 8, wherein the setting parameter is one of following:
a voltage of driving signal;
a driving time period;
a driving timing;
a detection time period;
a variable resistance of a detection circuit of the touch sensitive module;
an amplifier value of the detection circuit; and
a detection timing of the detection circuit.

11. The apparatus as claimed in claim 8, wherein the setting parameter is configured to control the touch sensitive module to turn on or off multiple-touch function for detecting more than one external conductive objects approaching or touching the touch screen.

12. The apparatus as claimed in claim 8, wherein the setting parameter is configured to control the touch sensitive module to turn on or off stylus detection function for detecting one or more styli approaching or touching the touch screen.

13. The apparatus as claimed in claim 8, wherein the touch screen comprises parallel first electrodes and parallel second electrodes, the first and the second electrodes intersect each other at multiple intersections, wherein the sensitive information comprises one or any combination of followings:
base values corresponding to the intersections;
detection values corresponding to the intersections;
difference values of the detection values corresponding to the intersections; and difference values of the difference values of the detection values corresponding to the intersections.

14. The apparatus as claimed in claim 8, wherein the touch screen comprises parallel first electrodes and parallel second electrodes, the first and the second electrodes intersect each other at multiple intersections, wherein the sensitive information comprises one or any combination of followings:

base values corresponding to the first electrodes;
detection values corresponding to the first electrodes;
difference values of the detection values corresponding to the first electrodes;
base values corresponding to the second electrodes;
detection values corresponding to the second electrodes; and
difference values of the detection values corresponding to the second electrodes.

\* \* \* \* \*